US010865918B2

(12) United States Patent
Channell et al.

(10) Patent No.: US 10,865,918 B2
(45) Date of Patent: Dec. 15, 2020

(54) BREAK-AWAY TRAFFIC FLANGE FOR A HYDRANT

(71) Applicant: Mueller International, LLC, Atlanta, GA (US)

(72) Inventors: Alan Channell, Albertville, AL (US); Christopher Joseph Duckett, Albertville, AL (US); Paul S. Gifford, Chattanooga, TN (US); Gary Wayne Hadley, Albertville, AL (US); Nelson Sanders McClure, Jr., Albertville, AL (US); Walter Pierce Wojick, Lookout Mountain, GA (US)

(73) Assignee: Mueller International, LLC, Atlanta, GA (US)

( * ) Notice: Subject to any disclaimer, the term of this patent is extended or adjusted under 35 U.S.C. 154(b) by 454 days.

(21) Appl. No.: 15/799,214

(22) Filed: Oct. 31, 2017

(65) Prior Publication Data

US 2019/0128452 A1 May 2, 2019

(51) Int. Cl.
*F16L 23/032* (2006.01)
*E03B 9/04* (2006.01)
*F16K 27/00* (2006.01)

(52) U.S. Cl.
CPC ............ *F16L 23/032* (2013.01); *E03B 9/04* (2013.01); *F16K 27/006* (2013.01)

(58) Field of Classification Search
CPC ...... F16K 123/032; F16K 27/006; E03B 9/04; Y10T 137/5327
See application file for complete search history.

(56) References Cited

U.S. PATENT DOCUMENTS

| | | | | | |
|---|---|---|---|---|---|
| 3,002,775 | A | * | 10/1961 | Mueller | E03B 9/04 403/2 |
| 3,076,474 | A | * | 2/1963 | Skomp | E03B 9/04 137/307 |
| 3,331,397 | A | * | 7/1967 | Mueller | E03B 9/04 137/797 |
| 4,127,142 | A | * | 11/1978 | Snider | E03B 9/04 137/285 |

(Continued)

OTHER PUBLICATIONS

Harvel, Gregory; Article entitled: "Construction Concerns: Dry-Barrel Hydrant Details", located at <: http://www.fireengineering.com/articles/2008/03/construction-concerns-dry-barrel-hydrant-details.html>, published Mar. 17, 2008, 5 pgs.

(Continued)

*Primary Examiner* — Kevin R Barss
(74) *Attorney, Agent, or Firm* — Taylor English Duma LLP

(57) ABSTRACT

A traffic flange for a hydrant includes: a body portion defining an arcuate shape and including an upper surface, a lower surface, an inner radial surface, and an outer radial surface, the body portion defining a body portion width in a radial direction relative to a main axis of the traffic flange, the body portion further defining a plurality of holes extending in an axial direction of the traffic flange relative to the main axis from the upper surface to the lower surface; and a break-away portion including a plurality of tabs extending radially inward in the radial direction from the inner radial surface of the body portion, a total width of the traffic flange in the radial direction of the traffic flange at each of the plurality of tabs greater than the body portion width.

22 Claims, 9 Drawing Sheets

(56) References Cited

U.S. PATENT DOCUMENTS

| | | | | |
|---|---|---|---|---|
| 4,596,263 | A | * | 6/1986 | Snider ............... E03B 9/04 137/493.3 |
| 4,717,178 | A | * | 1/1988 | Daghe ............... E03B 9/04 285/4 |
| 5,099,565 | A | * | 3/1992 | Campbell ........... E03B 9/04 137/15.02 |
| 5,865,430 | A | * | 2/1999 | Conover ........ B23K 37/0533 269/43 |
| 6,328,259 | B1 | * | 12/2001 | Bolukbasi ............ B64C 25/60 188/371 |
| 9,938,699 | B2 | | 4/2018 | Kennedy |
| 2006/0207657 | A1 | * | 9/2006 | Davidson, Sr. ........ E03B 9/04 137/299 |
| 2017/0350544 | A1 | * | 12/2017 | Sutton ................ E03B 9/04 |

OTHER PUBLICATIONS

Mueller Co; Brochure for Super Centurion 350 Fire Hydrant, copyright 2014, 1 pg.

Mueller Co; Catalog for O.E.M. Fire Hydrant Repair Parts and Repair Kits, publicly available prior to Oct. 31, 2017, 1 pg.

Mueller Co; Specification sheet for Mueller Super Centurion Hydrant, publicly available prior to Oct. 31, 2016, 1 pg.

* cited by examiner

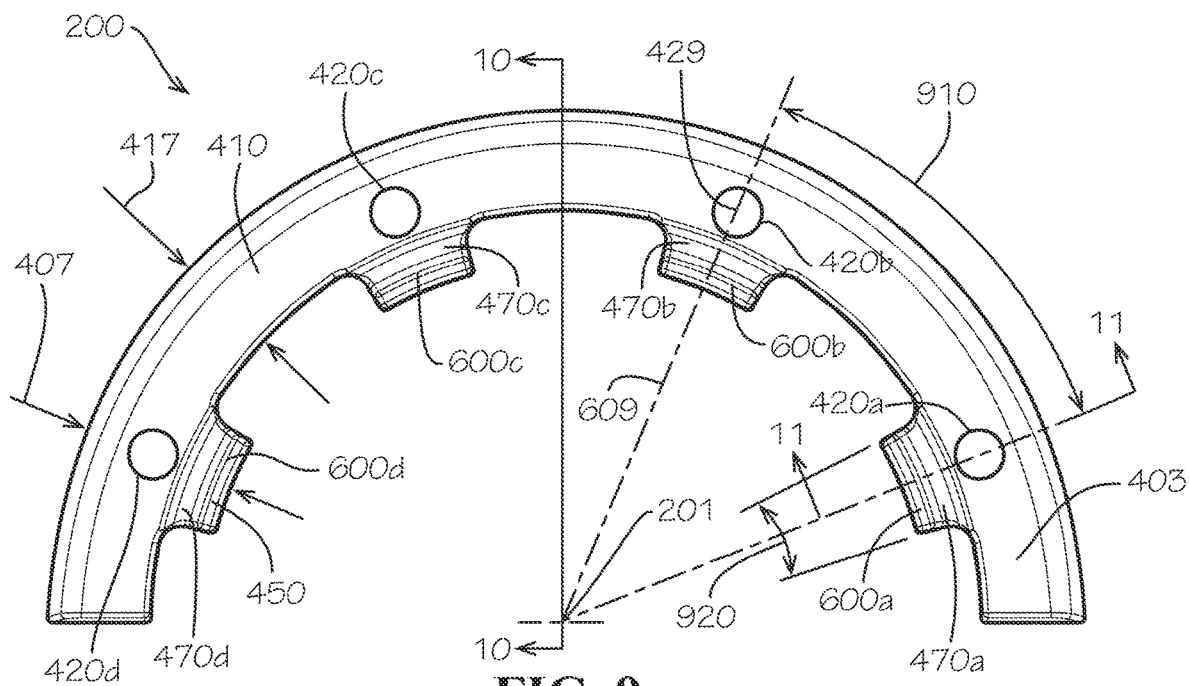
FIG. 9
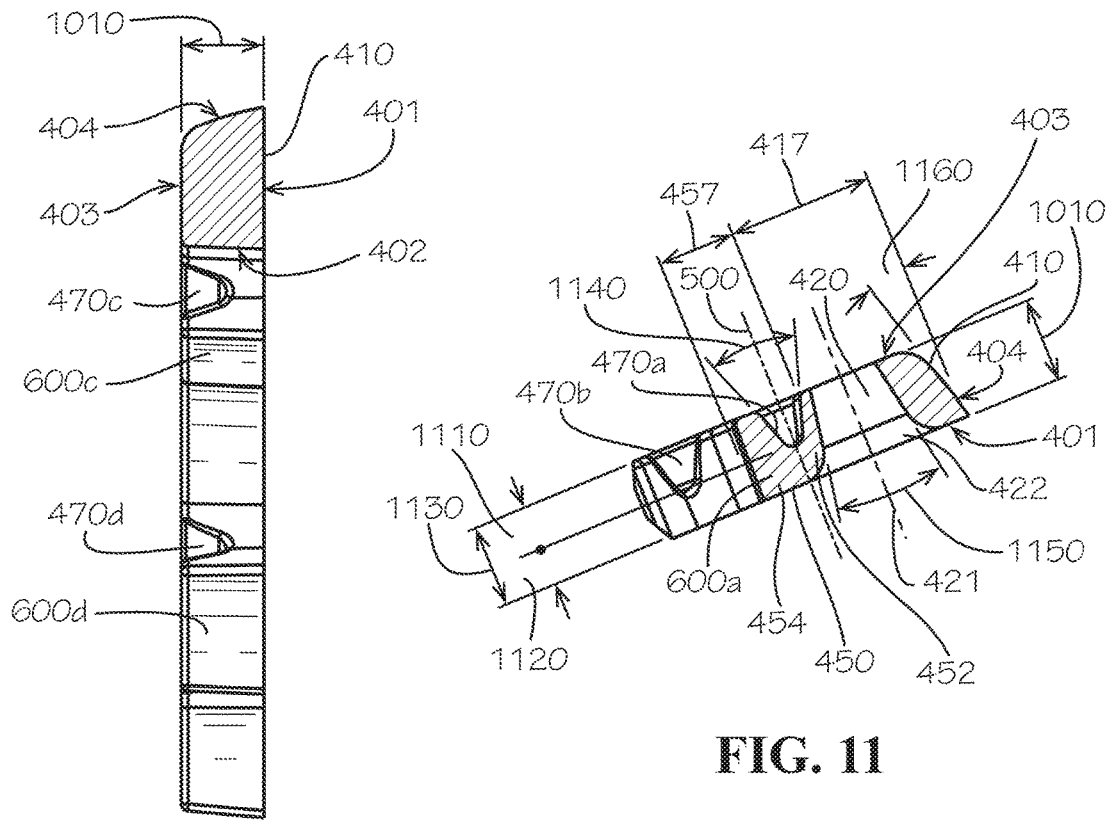
FIG. 10
FIG. 11

BREAK-AWAY TRAFFIC FLANGE FOR A HYDRANT

TECHNICAL FIELD

Field of Use

This disclosure relates to hydrants. More specifically, this disclosure relates to traffic flanges for a hydrant.

Related Art

A hydrant can comprise a traffic flange for connecting a hydrant body to a water supply system. The traffic flange can be designed to sacrificially fail under certain conditions. By failing sacrificially, the traffic flange can effectively protect other parts of the hydrant, typically those parts below the traffic flange. For example and without limitation, in a dry-barrel fire hydrant that has been damaged or even destroyed by impact by a moving vehicle, a main valve of the hydrant, which is typically buried in the ground below the traffic flange, can still function to seal off the water pressure. A traffic flange that fails prematurely or does not fail at all, however, can result in costly damage to the water supply system, unnecessary loss of the water itself, and loss of or damage to surrounding systems. Because of the design optimization necessary to ensure that the traffic flange will fail precisely when needed, a change as simple as in the material used to form the traffic flange can necessitate a redesign of the component.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a hydrant comprising: a hydrant body; a lower barrel detachably secured to the hydrant body, a top end of the lower barrel contacting a lower end of the hydrant body; a traffic flange comprising a body portion defining an arcuate shape and comprising an upper surface, a lower surface, an inner radial surface, and an outer radial surface, the body portion defining a body portion width in a radial direction relative to a main axis of the traffic flange, the body portion further defining a plurality of fastening holes extending in an axial direction of the flange relative to the main axis from the upper surface to the lower surface; and a break-away portion comprising a plurality of tabs extending radially inward in the radial direction from the inner radial surface of the body portion, a total width of the traffic flange in the radial direction of the traffic flange at each of the plurality of tabs greater than the body portion width; and a plurality of fasteners securing the hydrant body to the lower barrel, each of the plurality of fasteners extending through a one of the plurality of fastening holes of the traffic flange.

In a further aspect, disclosed is a traffic flange for a hydrant, the traffic flange comprising: a body portion defining an arcuate shape and comprising an upper surface, a lower surface, an inner radial surface, and an outer radial surface, the body portion defining a body portion width in a radial direction relative to a main axis of the traffic flange, the body portion further defining a plurality of holes extending in an axial direction of the traffic flange relative to the main axis from the upper surface to the lower surface; and a break-away portion comprising a plurality of tabs extending radially inward in the radial direction from the inner radial surface of the body portion, a total width of the traffic flange in the radial direction of the traffic flange at each of the plurality of tabs greater than the body portion width.

In yet another aspect, disclosed is a traffic flange for a hydrant, the traffic flange comprising: a body portion defining an arcuate shape and comprising an upper surface, a lower surface, an inner radial surface, and an outer radial surface, the body portion defining a body portion width in a radial direction relative to a main axis of the traffic flange, the body portion further defining a plurality of holes extending in an axial direction of the traffic flange relative to the main axis from the upper surface to the lower surface; and a break-away portion comprising an upper surface and a lower surface opposite from the upper surface, the break-away portion extending radially inward in the radial direction from the inner radial surface of the body portion, the break-away portion defining a notch proximate to a base of the break-away portion defined at an intersection between the break-away portion and the body portion; wherein the traffic flange comprises ductile iron.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 9 is a bottom plan view of the traffic flange of FIG. 6.

FIG. 10 is a sectional view of the traffic flange of FIG. 6 taken along line 10-10 of FIG. 9.

FIG. 11 is a sectional view of the traffic flange of FIG. 6 taken along line 11-11 of FIG. 9.

DETAILED DESCRIPTION

Figure 1:
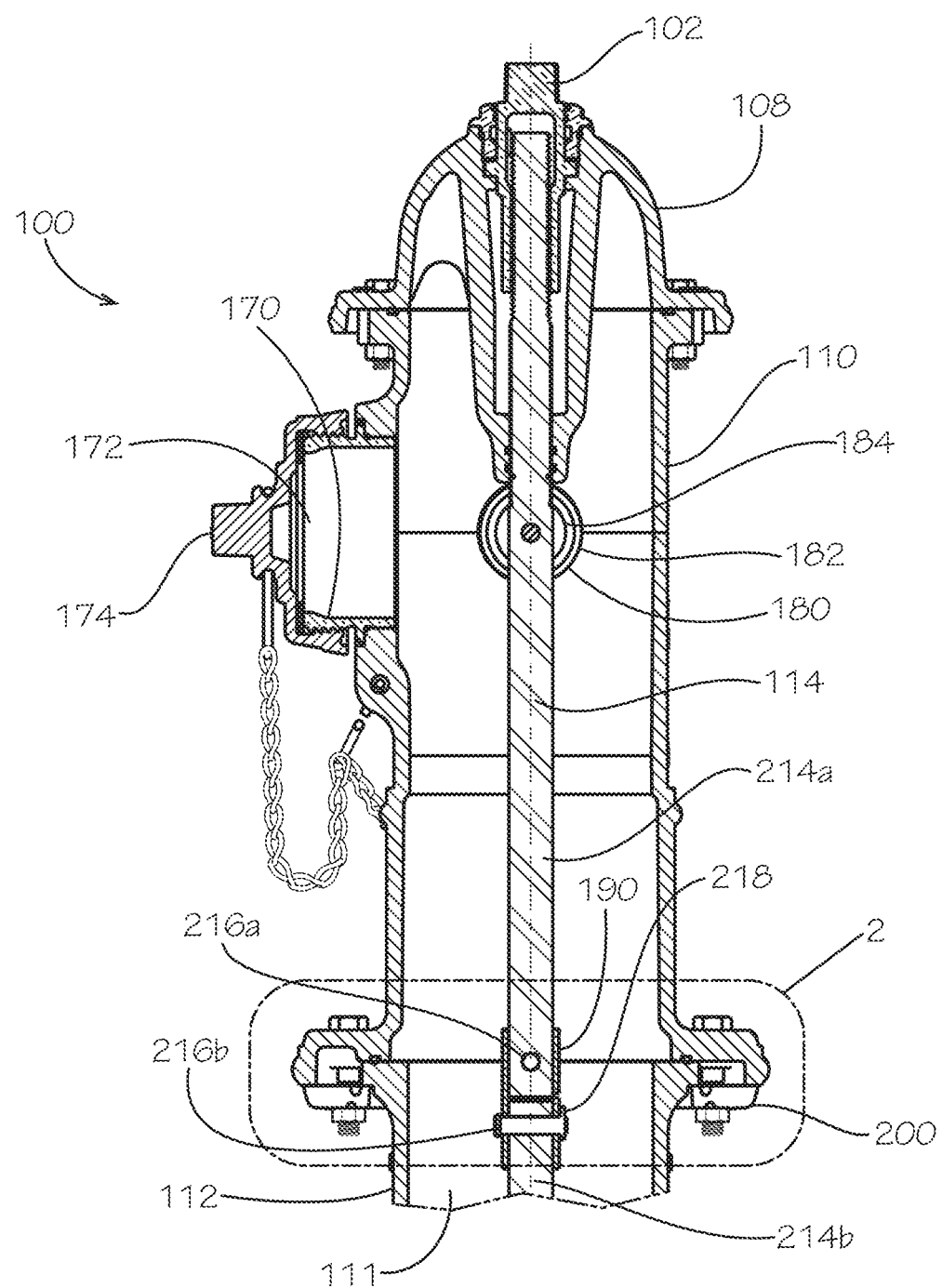
FIG. 1 is a sectional view of a hydrant with a traffic flange in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "top," "bottom," "upper," "lower," "inside," "outside," "inboard," "outboard," "horizontal," and/or "vertical" may be referenced. Unless stated otherwise, "top" describes that end of the hydrant nearest to a bonnet of the hydrant; and "bottom" is that end of the hydrant that is opposite or distal the top and generally, although not always, located underground. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a traffic flange and associated methods, systems, devices, and various apparatuses are disclosed herein. In some aspects, the traffic flange can comprise a tab. In other aspects, the traffic flange can comprise a notch or openings.

FIG. 1 shows a hydrant 100. In some aspects, the hydrant 100 can comprise a hydrant body 110, a bonnet 108 connected to a top end of the hydrant body 110, a lower barrel 112 connected to a bottom end of the hydrant body 110, and a hydrant shoe (not shown) connected to the bottom of the lower barrel 112. The hydrant body 110 or the lower barrel 112 or both can define an interior cavity 111. As shown, a traffic flange 200 can be used to connect the hydrant body 110 to the lower barrel 112 or directly to the hydrant shoe. The hydrant 100 can be connected to a water supply pipe or any other fluid supply pipe, which can be part of a larger water distribution system. In some aspects, the hydrant 100 can be a dry-barrel fire hydrant, which can be connected to the water distribution system with a hydrant shoe (not shown). In a dry-barrel fire hydrant, a main valve (not shown) can be closed to prevent water from moving from the hydrant shoe into the interior cavity 111. The dry-barrel fire hydrant is so named because closure of the main valve keeps the interior cavity 111 of the hydrant 100 dry. In other aspects, the hydrant 100 can be another type of fire hydrants such as, for example and without limitation, a wet-barrel fire hydrant. An operating nut 102 can be mounted on the bonnet 108 and can comprise a threaded connection (not shown) with a stem 114.

The stem 114 can comprise an upper stem portion 214a and a lower stem portion 214b. The upper stem portion 214a and the lower stem portion 214b can be connected by a stem coupling 190. The stem coupling 190 can be secured to the upper stem portion 214a and the lower stem portion 214b by a pair of clevis pins 216a,b, respectively, each of which can comprise a cotter pin 218. In other aspects, the upper stem portion 214a and the lower stem portion 214b can be connected by any fastener such as, for example and without limitation, welding, screws, or bolts, and the stem 114 can be a single or monolithic unit.

The hydrant body 110 can comprise a pumper nozzle 170 defining a pumper nozzle outlet 172 and a hose nozzle 180 defining a hose nozzle outlet 182. The pumper nozzle outlet 172 can be covered by a pumper nozzle cap 174, and the hose nozzle outlet 182 can be covered by a hose nozzle cap 184. The pumper nozzle cap 174 and the hose nozzle cap 184 can be made removable for attachment of a pumper and a hose, respectively, to the hydrant 100.

Figure 2:
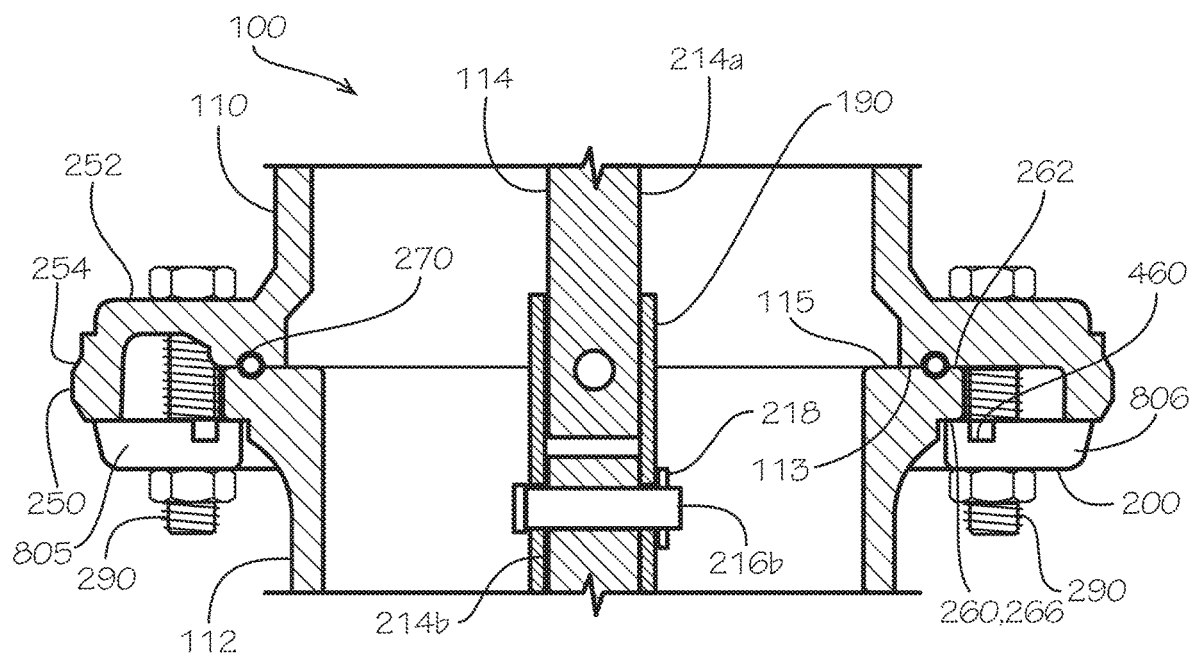
FIG. 2 is a detail view of the hydrant of FIG. 1 taken from Detail 2 of FIG. 1 with a traffic flange in accordance with another aspect of the current disclosure.

As shown in FIG. 2, the hydrant body 110 can comprise a body flange 250 that can extend radially from a bottom end 113 of the hydrant body 110. The body flange 250 can define a circular shape and can comprise a horizontal portion 252 and a vertical portion 254. The lower barrel 112 can comprise a barrel flange 260 that can extend radially from a top end 115 of the lower barrel 112. The barrel flange 260 can define a circular shape and can comprise a horizontal portion 262 and a vertical portion (not shown). The barrel flange 260 can comprise a shoulder 266, which can define a substantially horizontal surface against which the traffic flange 200 can contact. The lower barrel 112 can be detachably secured to the hydrant body 110. The top end 115 of the lower barrel 112 can contact the bottom end 113 of the hydrant body 110.

Figures 4, 5:
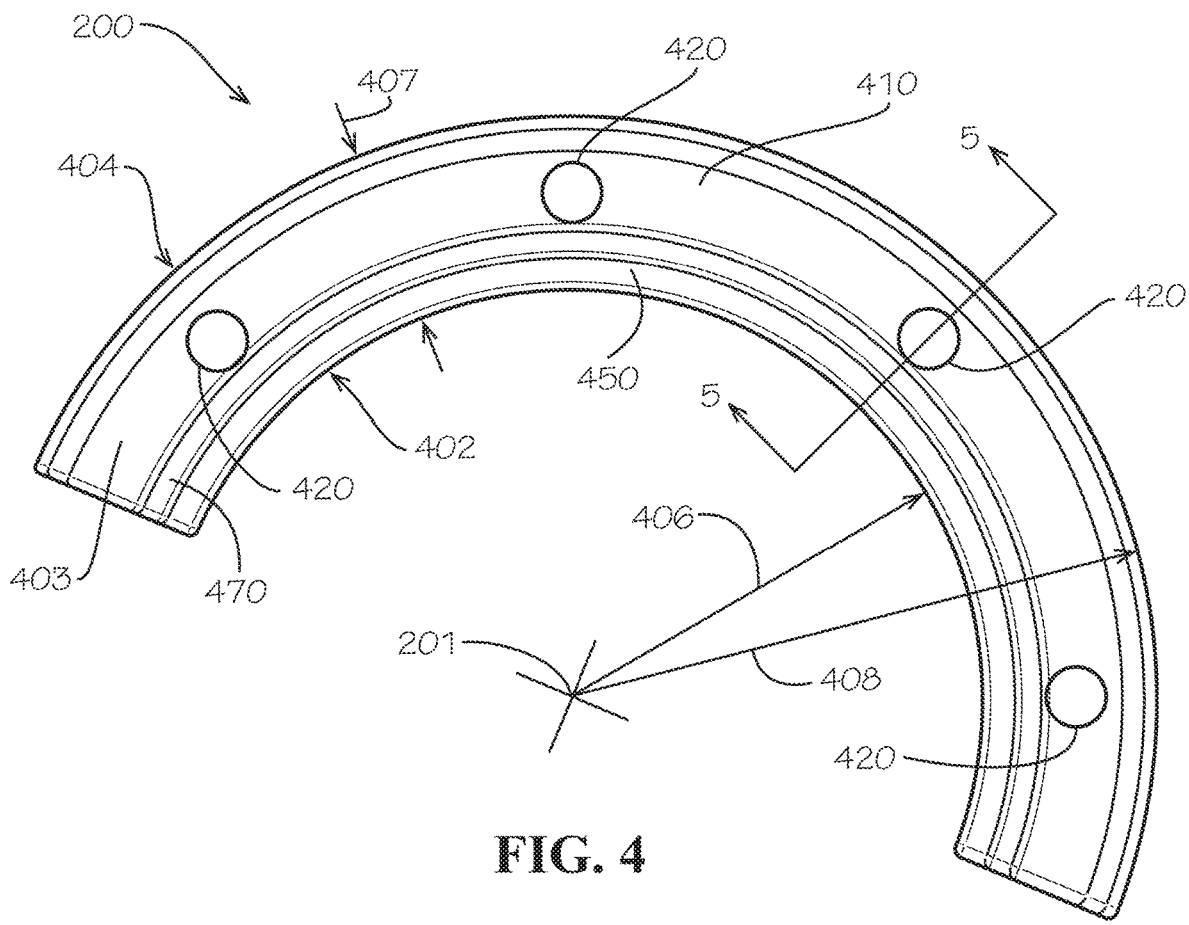
FIG. 4 is a bottom plan view of a traffic flange of the hydrant of FIG. 1 in accordance with another aspect of the current disclosure.
FIG. 5 is a sectional view of the traffic flange of FIG. 4 taken along line 5-5 of FIG. 4.

The hydrant 100 can comprise the traffic flange 200, a semicircular variation of which having a first end 805 and a second end 806 is shown, and a plurality of fasteners 290. The traffic flange 200 and the plurality of fasteners 290 can connect the body flange 250 of the hydrant body 110 to the barrel flange 260 of the lower barrel 112. More specifically, the fasteners 290 can extend through holes defined in each of the traffic flange 200 and the body flange 250, and can extend past or through the barrel flange 260. The hydrant 100 can comprise a gasket 270, which can be an O-ring positioned between the hydrant body 110 and the lower barrel 112. Each of the plurality of fasteners 290 can comprise a connecting device such as, for example and without limitation, a bolt and a nut as shown. As will be described in more detail below, the traffic flange 200 can comprise a notch 460 that can be configured to predictably weaken the traffic flange 200 under certain conditions such that pressure between the traffic flange 200 and a portion of the hydrant 100 such as, for example and without limitation, the shoulder 266 of the barrel flange 260 can cause a portion of the traffic flange 200 to break off and release the traffic flange 200 from the barrel flange 260. In some aspects, the notch 460 shown can be rectangular in cross-section. In other aspects, the notch 460 can have any shape such as, for example and without limitation, one that is substantially triangular or circular in cross-section. In yet other aspects, as shown in FIG. 5, the notch 460 can have a shape in cross-section that combines two or more of a rectangular, a triangular, a circular, or any other shape.

Figure 3:
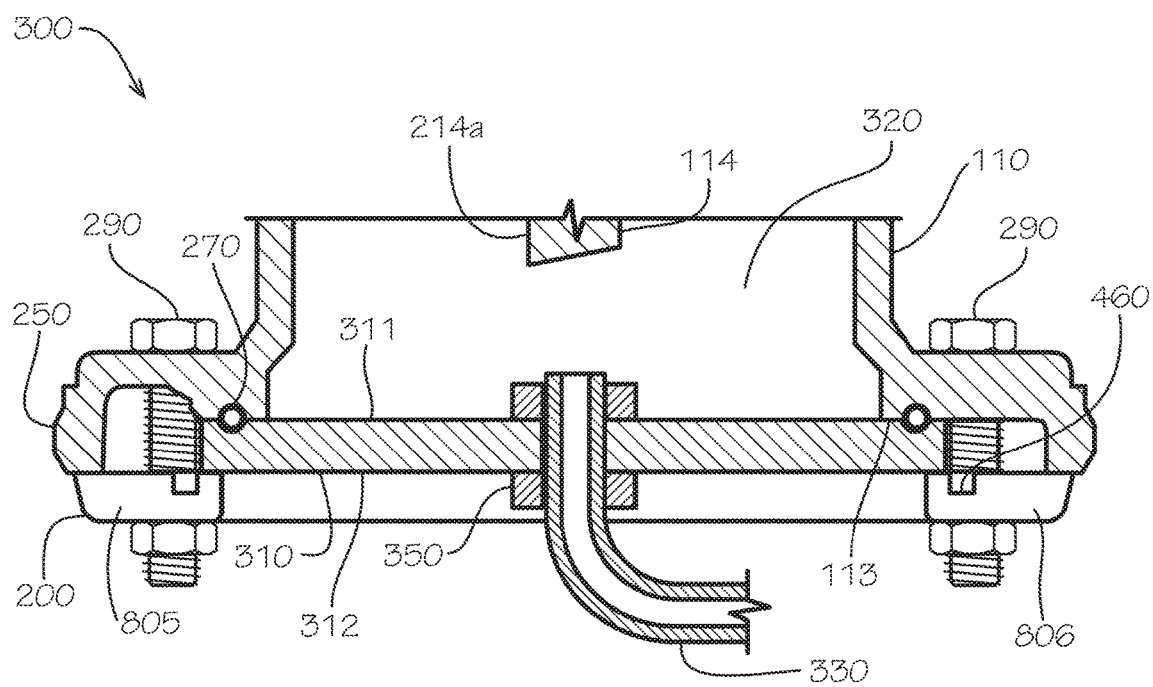
FIG. 3 is a detail view of a testing setup comprising the hydrant of FIG. 1 and the traffic flange of FIG. 2 taken from a perspective similar to that of Detail 2 of FIG. 1.

FIG. 3 shows a testing setup 300, which can comprise at least a portion of the hydrant 100. For example and without limitation, the testing setup 300 need not comprise the lower barrel 112. The testing setup 300 can, however, comprise the hydrant body 110, the traffic flange 200, and the fasteners 290. The testing setup 300 can further comprise an end plate 310 defining an inner surface 311 and an outer surface 312 to seal off the otherwise open bottom end 113 of the hydrant body 110. By securing the traffic flange 200 against the outer surface 312 of the end plate 310, the end plate 310 can seal off the bottom end 113 of the hydrant body 110. An interior cavity 320 of the testing setup 300 can thereby be isolated from the air outside the hydrant 100 and can be pressurized.

Similarly, the bonnet 108 can be replaced with a top plate (not shown) for testing purposes. The testing setup 300 can be used to perform testing on the hydrant 100 and, more specifically, the traffic flange 200. For example and without limitation, the testing setup 300 can be used to perform strength testing on the traffic flange 200. More specifically, the testing setup 300 can be used to determine when and how the traffic flange 200 will fail.

Importantly, as noted above, the traffic flange 200 is designed to fail under certain conditions. By failing sacrificially, the traffic flange 200 can protect other parts of the hydrant 100 including, for example and without limitation, some or all components that are below the traffic flange 200 such as the lower barrel 112 and the main valve (not shown), which are typically installed underground in a dry-barrel fire hydrant and when closed can hold back the water pressure even in a hydrant 100 that has been damaged by, for example and without limitation, impact by a moving vehicle (not shown). Even if such damage includes destruction of the hydrant body 110, the stem coupling 190, the stem 114, and/or another component of the hydrant 100, the main valve can still function to seal off the water and therefore guard against leakage of significant amounts of water that could otherwise flow from a broken hydrant such as the hydrant 100. Because it is designed to predictably fail, the traffic flange 200 can be described as a frangible part, where "frangible" means to be readily or easily broken.

The pressurized hydrant body 110 of the testing setup 300 can simulate the stresses from impact by the moving vehicle. This is because the forces and resulting stresses that act on and within the traffic flange 200 when the hydrant body 110 in the testing setup 300 is pressurized are not unlike the forces and stresses that act on and within the traffic flange 200 when the hydrant 100 is hit by a vehicle. In either case, the connection between the traffic flange 200 and the lower barrel 112 and, similarly, between the traffic flange 200 and the end plate 310 can experience compressive or tensile forces or both compressive and tensile forces (and, within the respective materials forming these components, compressive or tensile stresses or both compressive and tensile stresses) tending to cause bending of a radially inward portion of the traffic flange 200, especially at any weakened portions of the traffic flange 200. By simulating such forces and resulting stresses using the testing setup 300, one can more consistently, inexpensively, and safely test various hydrant components—such as the traffic flange 200—than with an actual test using the aforementioned moving vehicle. For example and without limitation, as done here, variations of the traffic flange 200 comprising different materials (including stronger or weaker materials), different cross-sectional shapes, and different overall shapes can be efficiently and accurately tested.

In some aspects, as shown, pressurization of the hydrant body 110 of the testing setup 300 can be achieved by forcing a gas such as nitrogen through an inlet tube 330 connected to the end plate 310 via a tube connection 350. In other aspects, the gas can be forced into the hydrant body 110 through other means and other locations of the testing setup 300. The inlet tube 330 can then be sealed or removed or fitted with a valve as desired to maintain a specific pressure inside the hydrant body 110 or to increase or decrease the pressure.

FIGS. 4 and 5 show another aspect of the traffic flange 200 of the hydrant 100. As shown, the traffic flange 200 can comprise a body portion 410 and a break-away portion 450. Either of the body portion 410 and the break-away portion 450 can define an arcuate shape. The traffic flange 200 can comprise an upper surface 401 (shown in FIG. 5), a lower surface 403, an inner radial surface 402, and an outer radial surface 404. The traffic flange 200 can define a total width 407, the body portion 410 can define a body portion width 417 (shown in FIG. 5), and the break-away portion 450 can define a break-away portion width 457 (shown in FIG. 5), each respective width being measured in a radial direction relative to a main axis 201 of the traffic flange 200. The body portion 410 can further define a plurality of fastening holes 420 extending in an axial direction of the traffic flange 200 relative to the main axis 201 from the upper surface 401 to the lower surface 403. The inner radial surface 402 can define a radius 406 and the outer radial surface 404 can define a radius 408. The break-away portion 450 can extend radially inward in the radial direction (i.e., towards the main axis 201 of the traffic flange 200) from the inner radial surface 402 of the body portion 410.

FIG. 5 shows a cross-section of the traffic flange 200 taken in FIG. 4 after it has been rotated 180 degrees (i.e., with the upper surface 401 facing up instead of down). As shown, the break-away portion 450 can define a base 452 and a tip 454. As will be described in further detail below, the break-away portion 450 can be configured to fail so that the traffic flange 200 can separate from the lower barrel 112 or from another portion of the hydrant 100. In some aspects, as shown, the tip 454 can be configured to separate from the base 452 along a failure plane 500, which can lie along an actual plane or can approximate a plane. In other aspects, the separation between the tip 454 and the base 452 can be non-planar. The failure plane 500 can be approximately aligned with a cross-sectional center of the notch 470 as shown or a cross-sectional center of the notch 460. The failure plane 500 can be angled with respect to the lower surface 403 by an angle 509. In some aspects, the angle 509 can measure 90 degrees. In other aspects, the angle 509 can measure more than or less than 90 degrees.

The break-away portion 450 can define a first notch 460, which can be defined in the upper surface 401 and can be proximate to the base 452 of the break-away portion 450. More specifically, the break-away portion 450 can define the first notch 460 at or proximate to an intersection between the break-away portion 450 and the body portion 410. The break-away portion 450 can further define a second notch 470, which can be defined in the lower surface 403 and can also be proximate to the base 452 of the break-away portion 450. More specifically, the break-away portion 450 can also define the second notch 470 at or proximate to an intersection between the break-away portion 450 and the body portion 410. Each of the fastening holes 420 can define a hole axis 421 extending therethrough.

Figure 6:
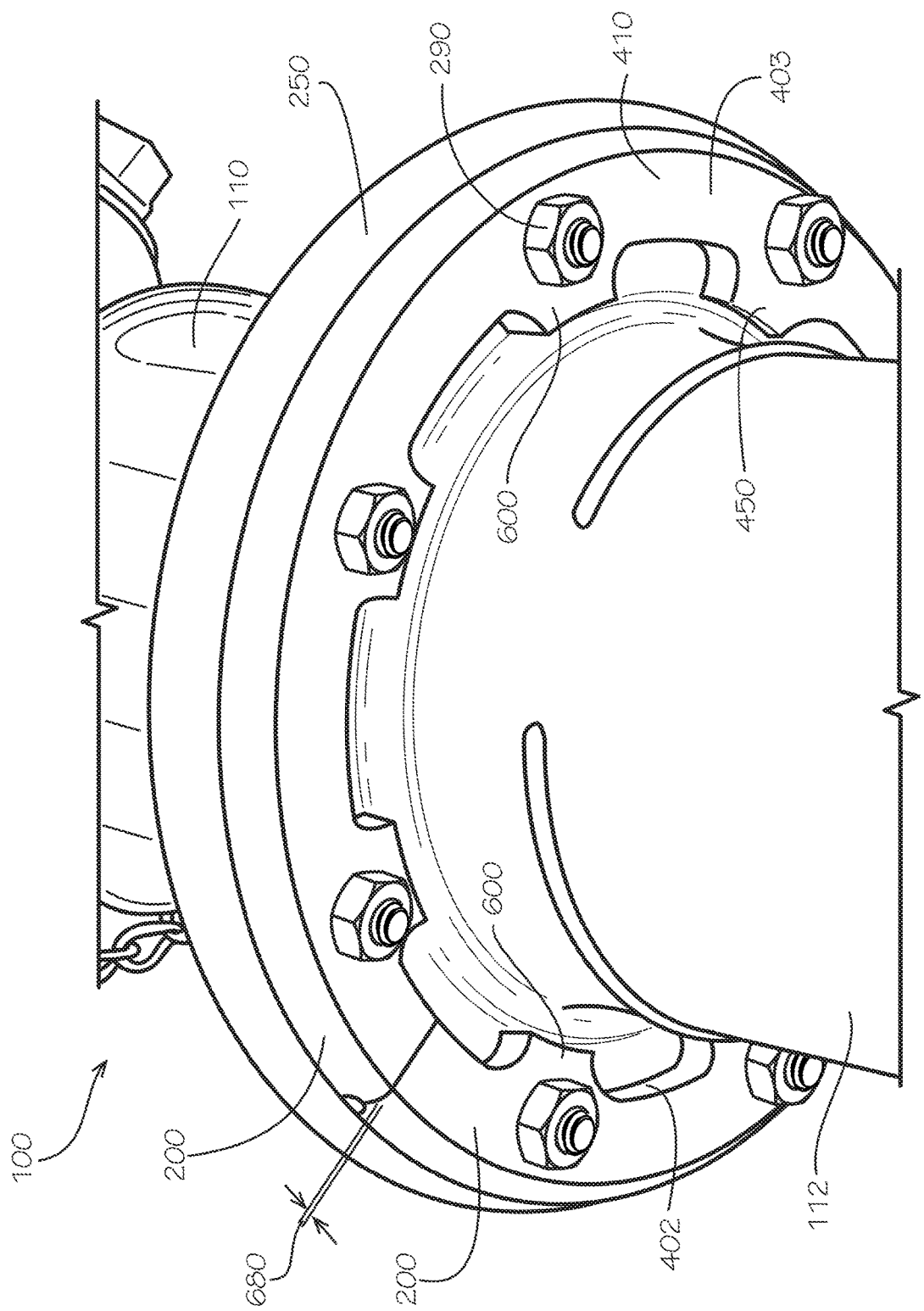
FIG. 6 is a bottom perspective view of a portion of a hydrant comprising a traffic flange in accordance with another aspect of the current disclosure.

In some aspects, as shown in FIG. 6, the break-away portion 450 of the traffic flange 200 can comprise a plurality of tabs 600 extending radially inward in the radial direction from the inner radial surface 402 of the body portion 410. Each of the plurality of tabs 600 can be aligned along a radial direction of the traffic flange 200 with a one of the plurality of fasteners 290—where the radial direction of the traffic flange 200 is with respect to the main axis 201 (shown in FIG. 4) of the traffic flange 200. As shown, the hydrant 100 can comprise more than one traffic flange 200. In some aspects, each traffic flange 200 can abut each adjacent traffic flange 200 such that a gap 680 therebetween is zero. More specifically, at least a portion of the ends 805,806 (both shown in FIG. 7) of each adjacent traffic flange 200 can sit flush against the other. In other aspects, the gap 680 can measure a non-zero value. As shown, each of the plurality of tabs 600 need not comprise the notch 460 nor the notch 470.

Each of the plurality of tabs 600 can be a lug, and the space between adjacent tabs 600 can define a scalloped shape or section.

Figure 7:
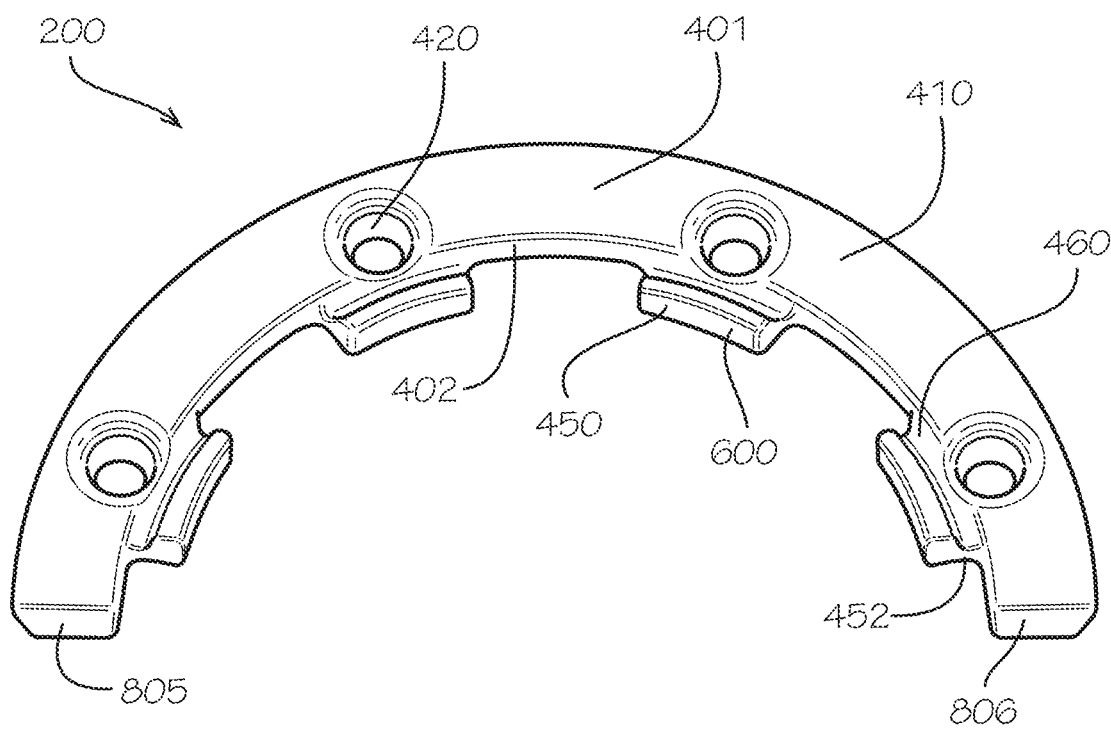
FIG. 7 is a top perspective view of the traffic flange of FIG. 6 in accordance with another aspect of the current disclosure.
Figure 8:
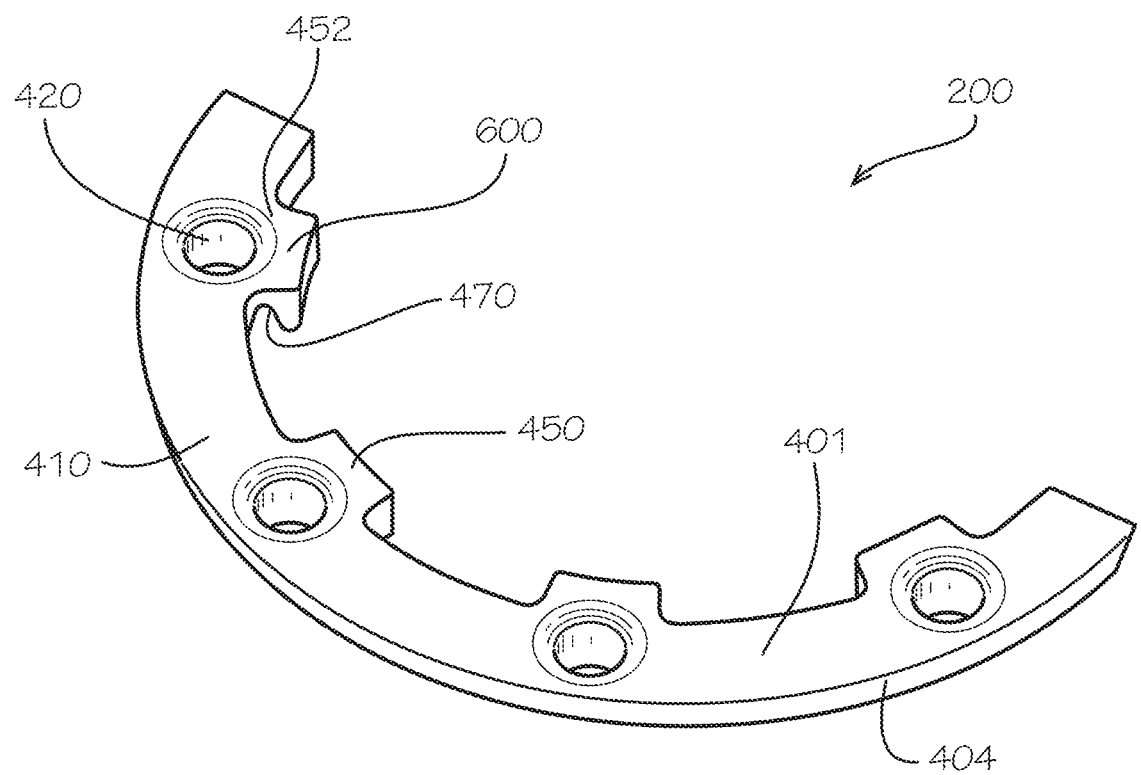
FIG. 8 is a top perspective view of the traffic flange of FIG. 6 in accordance with another aspect of the current disclosure.

As shown in FIGS. 7 and 8, each of the plurality of tabs 600 can define a one or even both of the notch 460 (shown in FIG. 7) and the notch 470 (shown in FIG. 8), either of which can be proximate to the base 452 of the respective tab 600 defined at an intersection between the break-away portion 450 and the body portion 410. The body portion 410 and the traffic flange 200 overall can each define an arcuate shape. More specifically, in some aspects, the traffic flange 200 or the body portion 410 of the traffic flange 200 can define a semicircular or half-ring shape. In other aspects, as will be described with respect to FIG. 14, the traffic flange 200 or the body portion 410 of the traffic flange 200 can define an arcuate shape that forms not a half of a circle but another whole or non-whole fraction of a circle. For example and without limitation, the body portion 410 can define an arcuate shape forming one-third or one-fourth of a circle such that the traffic flange 200 is divided into three or four or more segments. Each of the fastening holes 420 can be defined partially in the body portion 410 and partially in the break-away portion 450. As shown in FIG. 7, the plurality of notches 460 can be defined in the upper surface 401 of the traffic flange 200. As shown in FIG. 8, the plurality of notches 470 can be defined in the lower surface 403 (shown in FIG. 11) of the traffic flange 200.

As shown in FIG. 9, the total width 407 of the traffic flange 200 in the radial direction of the traffic flange 200 at each of a plurality of tabs $600a,b,c,d$ can be greater than the body portion width 417. In some aspects, as shown, a respective angular tab centerline 609 and the hole axis 421 of each of the plurality of tabs $600a,b,c,d$ and each of a plurality of fastening holes $420a,b,c,d$, respectively can be offset by an angle 910 with respect to the respective angular tab centerline 609 and the respective hole axis 421 of an adjacent tab $600a,b,c,d$ and fastening hole $420a,b,c,d$. In other aspects, also as shown, the angular tab centerline 609 and an angular hole centerline 429 can be aligned with one another. In some aspects, the angle 910 can be 45 degrees. In other aspects, the angle 910 can be less than or greater than 45 degrees. Each of the plurality of tabs $600a,b,c,d$ can define an angular tab width 920 (measured in degrees) that can be set as desired so that the tabs $600a,b,c,d$ of the traffic flange 200 fail under a particular load. In some aspects, the angular tab width 920 can measure about 17.5 degrees in a circumferential direction relative to the main axis 201 of the traffic flange 200. In other aspects, the angular tab width 920 can measure more than or less than 17.5 degrees to increase or decrease the load at which the traffic flange 200 will predictably and sacrificially fail. For example and without limitation, as will be described with respect to FIG. 15, the traffic flange 200 was tested with the angular tab width 920 measuring anywhere from less than 13 degrees to at least 20 degrees.

As shown in FIG. 10, the body portion 410 can define a body portion thickness 1010 measured from the upper surface 401 to the lower surface 403.

As shown in FIG. 11, each of the plurality of tabs $600a,b,c,d$ of the break-away portion 450 can define a notch depth 1110, a minimum tab thickness 1120 at a bottom of the respective notch $470a,b,c,d$, and a total tab thickness 1130 equal to a sum of the notch depth 1110 and the minimum tab thickness 1120 (and the notch 460 can define corresponding geometry). The minimum tab thickness 1120 can be less than a thickness of the tab $600a,b,c,d$ distal from the base 452 of the tab $600a,b,c,d$ such as the total tab thickness 1130.

As shown, the total tab thickness 1130 can be equal to the body portion thickness 1010. In some aspects, the minimum tab thickness 1120 of the break-away portion 450 at the bottom of the notch 470a,b,c,d (and corresponding geometry of the notch 460) can be no more than half of the body portion thickness 1010. In other aspects, the minimum tab thickness 1120 of the break-away portion 450 at the bottom of the notch 470a,b,c,d (and similarly a tab thickness of the notch 460) can be more than half of the body portion thickness 1010. The notch 470a,b,c,d (and similarly the notch 460) can define a notch taper 1140 such that the notch 470a,b,c,d (and similarly the notch 460 where present) tapers in cross-section toward the bottom of the notch 470 a,b,c,d.

As shown, each of the fastening holes 420a,b,c,d can define the hole axis 421 and can comprise an edge treatment 422, which can be, for example and without limitation, a chamfered edge or a rounded edge. Each of the fastening holes 420a,b,c,d, the inner radial surface 402, the outer radial surface 404, and other features of the traffic flange can be drafted (i.e., angled with respect to an axial direction of the traffic flange as defined by the main axis 201). For example and without limitation, each of the fastening holes 420a,b,c,d can define a draft angle 1150, and the outer radial surface 404 can define a draft angle 1160.

Figure 12:
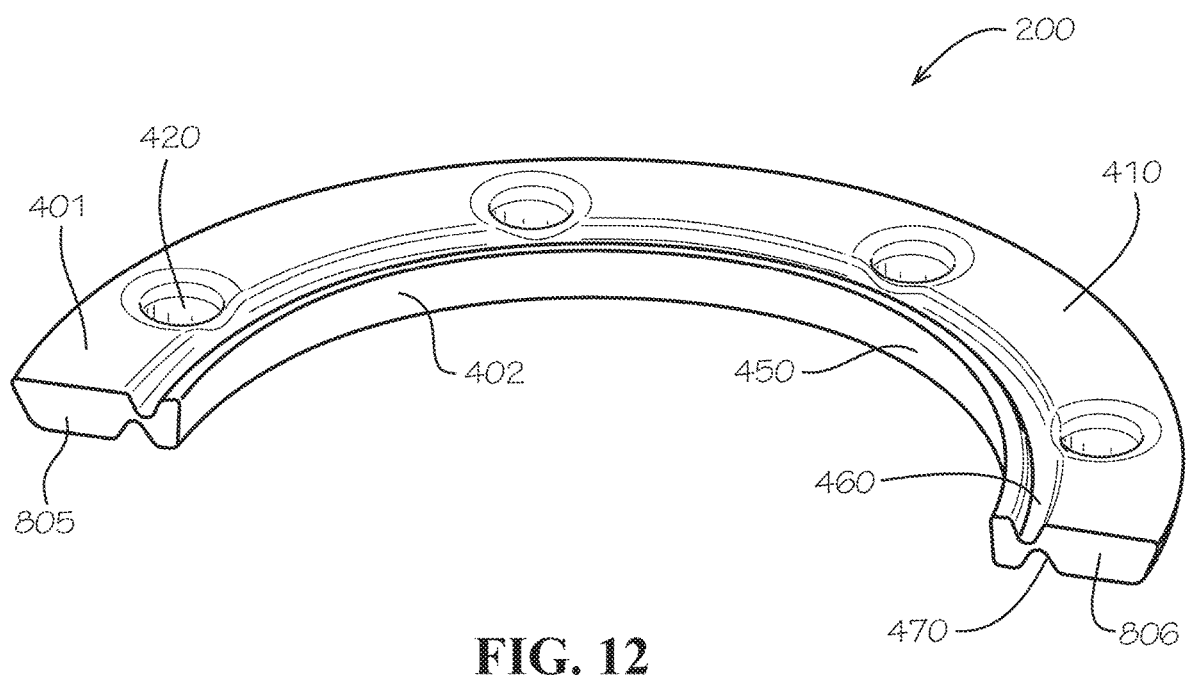
FIG. 12 is a top perspective view of a traffic flange in accordance with another aspect of the current disclosure.

As shown in FIG. 12, the traffic flange 200 can define both the notch 460 in the upper surface 401 of the traffic flange 200 and the second notch 470 in the lower surface 403 of the traffic flange 200. Both the break-away portion 450 and the notches 460,470 can extend the full angular length of the traffic flange 200 from the first end 805 to the second end 806. In some aspects, as shown, the notch depth 1110 (shown in FIG. 11) of each of the notch 460 and the notch 470 can be at least a full half of the body portion thickness 1010 (shown in FIG. 11).

Figure 13:
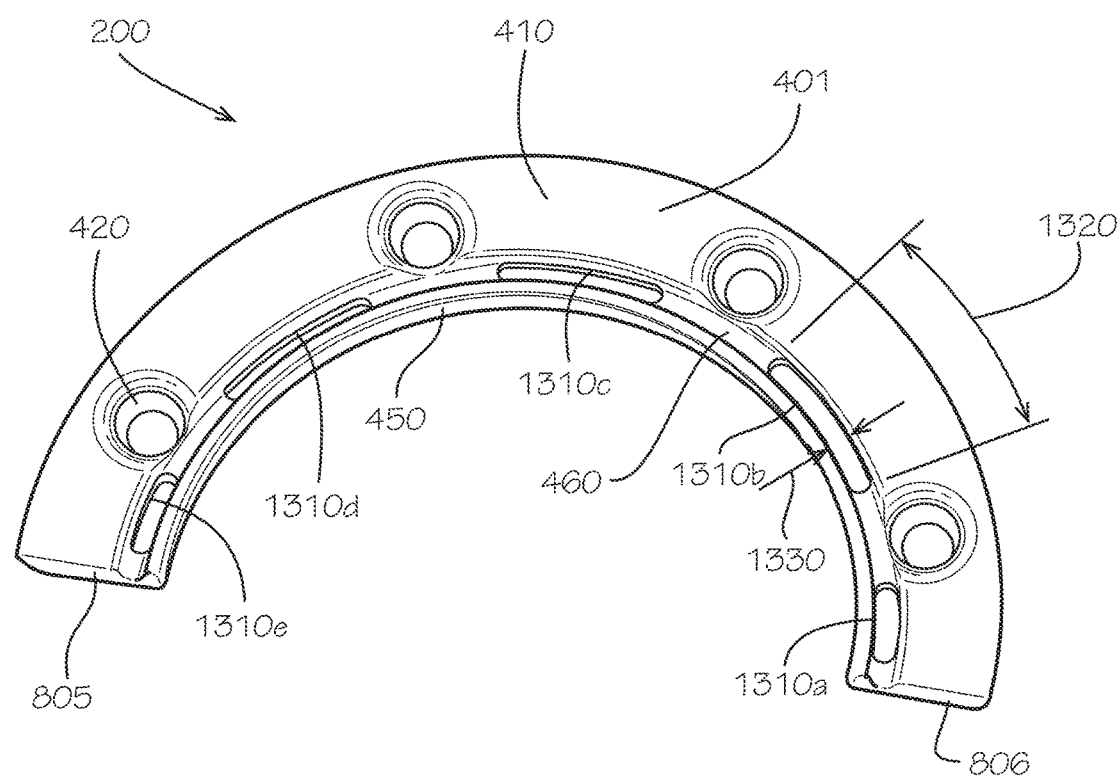
FIG. 13 is a top perspective view of a traffic flange in accordance with another aspect of the current disclosure.

As shown in FIG. 13, the break-away portion 450 can define a plurality of openings 1310a,b,c,d,e, each of which can be configured to predictably weaken the traffic flange 200. Each of the plurality of openings 1310a,b,c,d,e can extend from the upper surface 401 to the lower surface 403. Each of the openings 1310a,b,c,d,e can define a angular opening width of 1320 (measured in degrees) and a radial opening width 1330. As shown, the angular opening width 1320 of some of the openings 1310a,b,c,d,e can be smaller or larger than the angular opening width 1320 of the other openings 1310a,b,c,d,e. Each of the openings 1310a,b,c,d,e can be spaced evenly in a circumferential direction around the traffic flange 200 and as shown can be centered between adjacent holes of the plurality of fastening holes 420. In some aspects, as shown, the traffic flange 200 can define five openings 1310a,b,c,d,e. In other aspects, the traffic flange 200 can define more than five or less than five openings.

Figure 14:
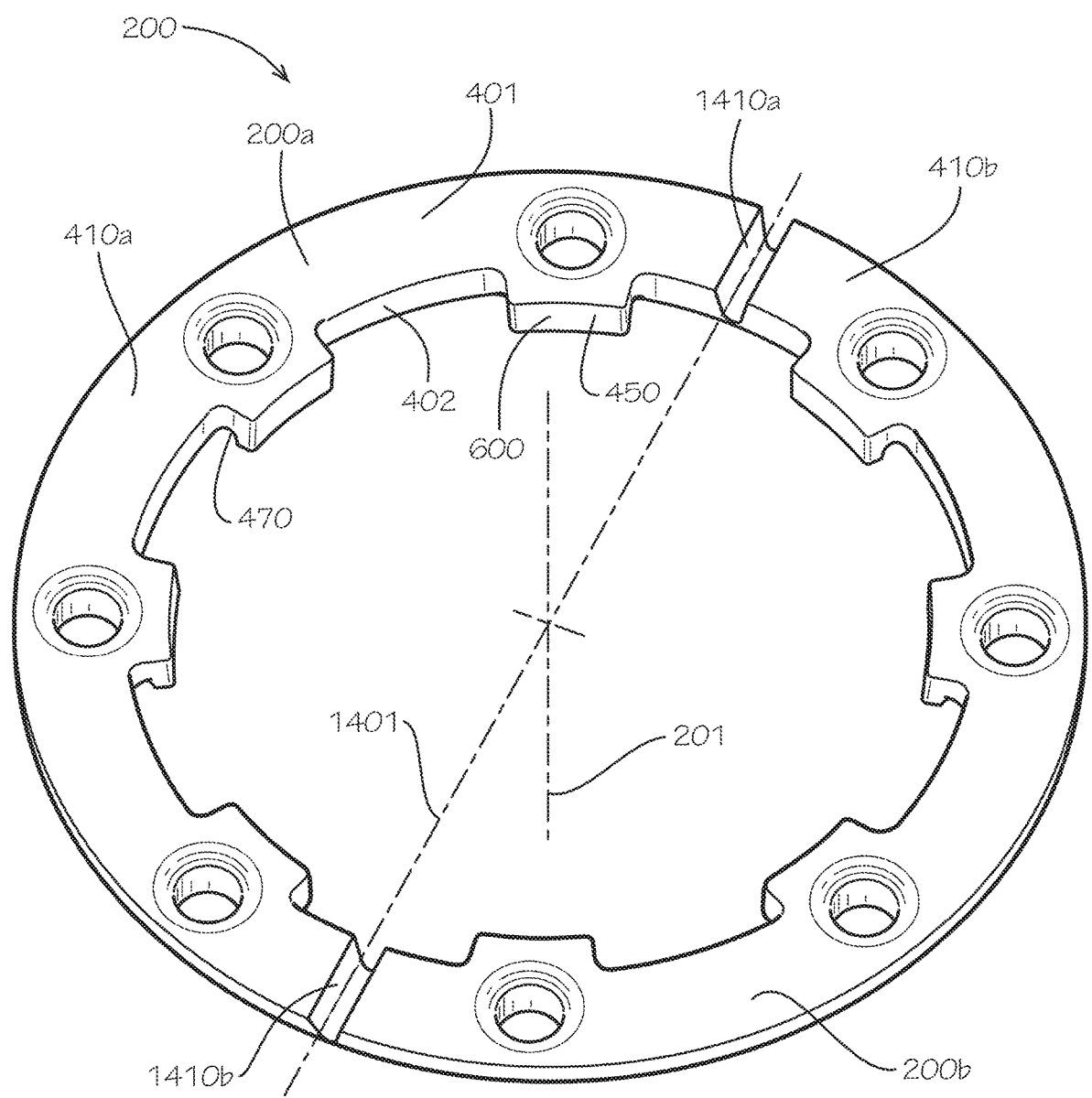
FIG. 14 is a top perspective view of a traffic flange in accordance with another aspect of the current disclosure.

As shown in FIG. 14, the body portion 410 of the traffic flange 200 can define a first half 200a and a second half 200b defining a monolithic whole. The first half 200a and the second half 200b can define a first notch 1410a at a first connection between the first half 200a and the second half 200b and a second notch 1410b at a second connection between the first half 200a and the second half 200b. In some aspects, each of the first notch 1410a and the second notch 1410b can be aligned with the radial direction relative to the main axis 201 of the traffic flange and along a transverse notch axis 1401. In other aspects, the first notch 1410a and the second notch 1410b can be spaced differently and need not be aligned with the radial direction relative to the main axis 201 of the traffic flange nor along the transverse notch axis 1401. In other aspects, additional notches can be present and can divide the traffic flange 200 into more than two portions of a monolithic whole.

Figure 15:
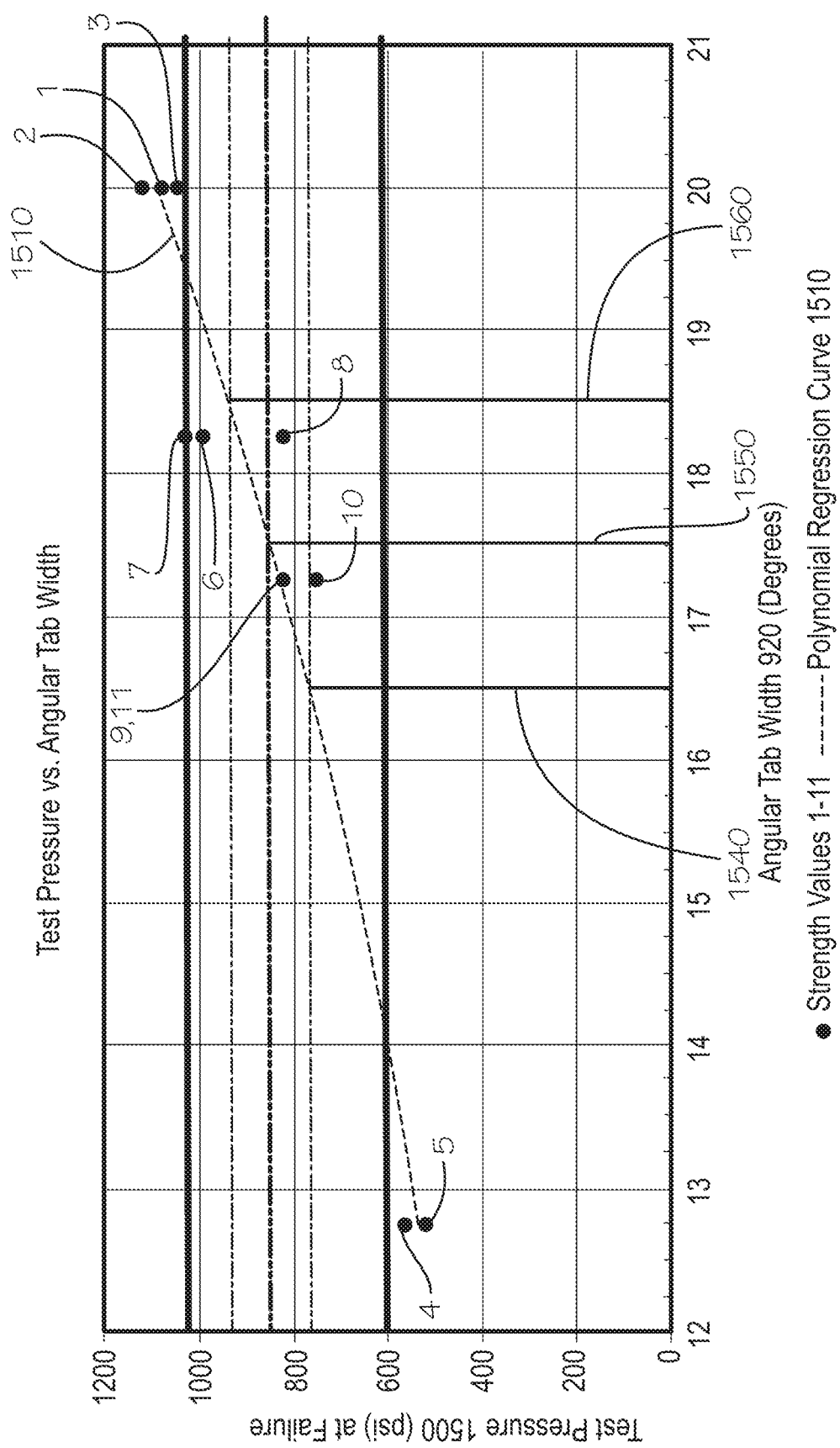
FIG. 15 is a graph of test pressure versus angular tab width showing data from testing the traffic flange of FIG. 9.

As shown in FIG. 15, various data can be gathered (and were gathered) using the testing setup 300 to optimize various aspects of the design of the traffic flange 200 or to see the effect of changing different dimensions or test parameters. Data points representing strength values 1-11 represent a set of data collected from testing of the traffic flange 200 shown in FIGS. 9-11. More specifically, each strength value 1-11 has been graphed according to the angular tab width 920 and a measured test pressure 1500. After collecting and mapping the strength values 1-11 based on testing a typical set of three samples of each particular traffic flange 200, a polynomial regression curve 1510 (best fit curve) was calculated (e.g., using a computer). The resulting polynomial regression formula was, for example and without limitation, as follows: y-4.6635$x^2$-76.024x=748.3 (where $R^2$=0.9079). Under the conditions tested, under the particular hydrant 100 analyzed, and for the particular end user envisioned, based on the strength values 1-11 measured, the optimal width 1550 was determined to be 17.5 degrees. Going ten percent above and below the optimal width 1550 yields a lower width tolerance of 1540 and an upper width tolerance of 1560. In other aspects, the optimal width 1550 can vary based on various factors such as, for example and without limitation, the size of the hydrant 100, the number of tabs 600 or spacing of the tabs 600 on the traffic flange 200, the specific use or installation location of the hydrant 100, or the particular requirements of an end user.

Some challenges were encountered or avoided during testing of the traffic flange 200, some unique to testing of the traffic flange 200 formed from ductile iron. For example and without limitation, initial leaking of the testing setup 300 resulted in the traffic flange 200 formed from ductile iron not failing at even the highest pressures achievable under an early variation of the testing setup 300. As a result, the gasket 270 was added to the testing setup 300 (as shown in FIG. 3) to enable testing of the traffic flange 200 to failure. Other testing considerations included dropping the testing setup 300 into an underground pit for safety, lubricating the fasteners 290, using a sufficiently thick end plate 310 (an end plate 310 having a thickness of 0.687" sufficed), properly selecting the fasteners (Grade 8 bolts sufficed), sufficiently torqueing the fasteners 290, and properly installing the load cells used during the tests. Testing made use of "donut" style strain gages or load cells, which were distributed among the fasteners 290 as desired based on a desired balance of accuracy and cost and, where used, were positioned between a head of the fastener 290 and the horizontal portion 252 of the body flange 250 of the hydrant body 110. Testing the traffic flange 200 included—and installation of the traffic flange 200 on the hydrant 100 can include—preloading the fasteners 290 such that even when the hydrant 100 is not pressurized with water—or any other fluid transported by the system to which it is attached—the traffic flange 200 can be held tightly against the barrel flange 260 and can thereby experience internal stresses that can impact when the traffic flange 200 fails.

The traffic flange can comprise a material having a tensile strength of at least about 60,000 psi. More specifically, the traffic flange can comprise ductile iron. In some aspects, for example and without limitation as shown in FIGS. 1-5, the traffic flange 200 can comprise gray iron. Ductile iron can generally be stronger than gray iron (twice as strong as a general rule) and can have more consistent strength properties than gray iron. For example, in some aspects, ductile iron according to ASTM A536 can have a tensile strength of 60,000 psi, 65,000 psi, or 70,000 psi in 60-40-18, 65-45-12, or 70-50-05 grades, respectively, where the first number in the grade designation indicates the tensile strength in ksi (or 1,000 psi), the second number designates the yield strength in ksi, and the third number indicates the elongation of a test specimen as a percentage. In other aspects, ductile iron can be made weaker or stronger. In contrast, gray iron according to ASTM A126 can have a tensile strength of only 31,000 psi in a Class B grade.

Other parts of the hydrant 100 can be likewise made of ductile iron to take advantages of the higher strength of the material. Importantly, such strengthening of the parts of the hydrant 100 can enable the hydrant 100 to withstand a higher water system pressure than what is standard or typical in the industry (e.g., 350 psi instead of 250 psi). The difference between two systems rated at 350 psi and 250 psi, respectively, can be only 100 psi in rated pressure. For the purpose of testing the hydrant 100 and the traffic flange 200 in particular, however, the corresponding difference in the test pressure 1500 is actually 400 psi with a safety factor of (4) times the rated factor (or 1400 psi versus 1000 psi) and even greater with larger safety factors (and less, of course, with smaller safety factors). Components such as the traffic flange 200 must also generally be easily manufacturable on a large scale.

The increased strength of ductile iron necessitated a redesign of the traffic flange as reflected in FIGS. 6-14. Until now, no known attempts, much less successful attempts to design a ductile iron traffic flange (or a traffic flange from a material that is stronger than gray iron) have been made. This is for at least the reason that previous traffic flanges, if formed from ductile iron, will not fail under the loads under which they need to fail and therefore will not accomplish the purpose for which a sacrificial traffic flange is designed.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A hydrant comprising:
    a hydrant body;
    a lower barrel detachably secured to the hydrant body, a top end of the lower barrel contacting a lower end of the hydrant body;
    a traffic flange comprising
        a body portion defining an arcuate shape defining a non-whole fraction of a circle, the body portion comprising an upper surface, a lower surface, an inner radial surface, and an outer radial surface, the body portion defining a body portion width in a radial direction relative to a main axis of the traffic flange, the body portion further defining a plurality of fastening holes extending in an axial direction of the traffic flange relative to the main axis from the upper surface to the lower surface; and
        a break-away portion extending from the body portion and comprising a plurality of tabs extending radially inward in the radial direction from the inner radial surface of the body portion, a total width of the traffic flange in the radial direction of the traffic flange at each of the plurality of tabs greater than a total width of the traffic flange in the radial direction of the traffic flange between adjacent tabs of the plurality of tabs; and
    a plurality of fasteners securing the hydrant body to the lower barrel, each of the plurality of fasteners extending through a one of the plurality of fastening holes of the traffic flange, wherein each tab of the plurality of tabs, positioned in a radial direction, is adjacent to a corresponding fastening hole of the plurality of fastening holes.

2. The hydrant of claim 1, wherein the body portion of the traffic flange is semicircular in shape, the body portion being a first body portion, the traffic flange further comprising a second body portion defining a semicircular shape.

3. The hydrant of claim 1, wherein the traffic flange comprises a material having a tensile strength of at least about 60,000 psi.

4. The hydrant of claim 1, each of the plurality of tabs defining a notch proximate to a base of the respective tab defined at an intersection between the tab and the body portion, each of the plurality of tabs defining a minimum tab thickness at a bottom of the corresponding notch that is less than a total tab thickness of the tab distal from the base of the tab.

5. The hydrant of claim 4, wherein the notch tapers in cross-section toward the bottom of the notch.

6. The hydrant of claim 1, wherein an angular tab width of each of the plurality of tabs is 17.5 degrees.

7. The hydrant of claim 1, wherein each of the plurality of tabs is aligned along the radial direction of the traffic flange with a one of the plurality of fasteners.

8. The hydrant of claim 1, wherein an angular tab width of each of the plurality of tabs is in a range of 13 to 20 degrees.

9. A traffic flange for a hydrant, the traffic flange comprising:
    a body portion defining an arcuate shape and comprising an upper surface, a lower surface, an inner radial surface, and an outer radial surface, the body portion defining a body portion width in a radial direction relative to a main axis of the traffic flange, the body portion further defining a plurality of holes extending in an axial direction of the traffic flange relative to the main axis from the upper surface to the lower surface; and a break-away portion extending from the body portion and comprising a plurality of tabs extending radially inward in the radial direction from the inner radial surface of the body portion, a total width of the traffic flange in the radial direction of the traffic flange at each of the plurality of tabs greater than a total width of the traffic flange in the radial direction of the traffic flange between adjacent tabs of the plurality of tabs, wherein each tab of the plurality of tabs, positioned in a radial direction, is adjacent to a corresponding fastening hole of the plurality of fastening holes.

10. The traffic flange of claim 9, wherein the body portion of the traffic flange defines a semicircular shape.

11. The traffic flange of claim 9, wherein the traffic flange comprises ductile iron.

12. The traffic flange of claim 9, wherein each of the plurality of tabs defines a notch proximate to a base of the tab defined at an intersection between the tab and the body portion, each of the plurality of tabs defining a minimum tab thickness at a bottom of the corresponding notch that is less than a total tab thickness of the tab distal from the base of the tab.

13. The traffic flange of claim 9, wherein an angular tab width of each of the plurality of tabs is in a range of 13 to 20 degrees.

14. The traffic flange of claim 9, wherein each of the plurality of tabs is aligned along the radial direction with a one of the plurality of holes of the body portion.

15. The traffic flange of claim 9, wherein the body portion of the traffic flange defines a circular shape.

16. The traffic flange of claim 15, wherein the body portion defines a first half and a second half defining a monolithic whole, the first half and the second half defining a first notch at a first connection between the first half and the second half and a second notch at a second connection between the first half and the second half, each of the first notch and the second notch aligned with the radial direction.

17. A traffic flange for a hydrant, the traffic flange comprising:

a monolithic body portion defining an arcuate shape comprising an upper surface, a lower surface, an inner radial surface, and an outer radial surface, the body portion defining a body portion width in a radial direction relative to a main axis of the traffic flange, the body portion further defining a plurality of holes extending in an axial direction of the traffic flange relative to the main axis from the upper surface to the lower surface; and a break-away portion extending from the body portion and comprising an upper surface and a lower surface opposite from the upper surface, the break-away portion extending radially inward in the radial direction from the inner radial surface of the body portion, the break-away portion defining a notch proximate to a base of the break-away portion defined at an intersection between the break-away portion and the body portion, the break-away portion further defining one of a plurality of tabs and a plurality of openings, each of the plurality of tabs extending radially inward in the radial direction from the inner radial surface of the body portion and each of the plurality of openings extending from the upper surface of the break-away portion to the lower surface of the break-away portion, each of the plurality of openings configured to weaken the traffic flange against loads applied to the break-away portion in the axial direction of the traffic flange.

18. The traffic flange of claim 17, wherein the body portion defines a semicircular shape.

19. The traffic flange of claim 17, wherein the notch is a first notch defined in the upper surface of the break-away portion, the break-away portion further defining a second notch in the lower surface of the break-away portion.

20. The traffic flange of claim 17, wherein the break-away portion defines the plurality of openings.

21. The traffic flange of claim 17, wherein the break-away portion comprises the plurality of tabs, a total width of the traffic flange in the radial direction at each of the plurality of tabs greater than a total width of the traffic flange in the radial direction of the traffic flange between adjacent tabs of the plurality of tabs.

22. The traffic flange of claim 17, wherein the traffic flange comprises ductile iron.

* * * * *